(12) United States Patent
Hernier et al.

(10) Patent No.: US 9,079,580 B2
(45) Date of Patent: Jul. 14, 2015

(54) METHOD AND SYSTEM FOR CONTROLLING A VEHICLE HAVING A HYBRID DRIVE

(75) Inventors: Markus Hernier, Gerlingen (DE); Andreas Greis, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1271 days.

(21) Appl. No.: 12/735,964

(22) PCT Filed: Nov. 25, 2008

(86) PCT No.: PCT/EP2008/066143
§ 371 (c)(1),
(2), (4) Date: Nov. 16, 2010

(87) PCT Pub. No.: WO2009/112103
PCT Pub. Date: Sep. 17, 2009

(65) Prior Publication Data
US 2012/0095665 A1    Apr. 19, 2012

(30) Foreign Application Priority Data

Mar. 10, 2008   (DE) .......................... 10 2008 000 578

(51) Int. Cl.
*F02B 47/08* (2006.01)
*B60W 20/00* (2006.01)
*F02D 41/00* (2006.01)
(Continued)

(52) U.S. Cl.
CPC .................. *B60W 20/00* (2013.01); *B60K 6/44* (2013.01); *B60K 6/48* (2013.01); *B60W 10/06* (2013.01); *B60W 10/08* (2013.01); *F02D 41/0072* (2013.01); *B60L 2240/423* (2013.01); *B60W 2540/10* (2013.01); *B60W 2540/12* (2013.01); *B60W 2710/0666* (2013.01); *B60W 2710/083* (2013.01); *Y02T 10/54* (2013.01); *Y02T 10/56* (2013.01); *Y02T 10/623* (2013.01);
(Continued)

(58) Field of Classification Search
CPC . B60W 20/10; B60W 20/1082; B60W 20/20; F02M 25/07; F02M 2025/0763; F02M 41/0065; F02M 41/0072
USPC .......... 180/65.21–65.29; 123/568.11–568.32; 701/108; 903/902–960
See application file for complete search history.

(56) References Cited

U.S. PATENT DOCUMENTS 6,266,956 B1    7/2001  Suzuki et al.
6,301,529 B1 *  10/2001 Itoyama et al. .................. 701/22
(Continued)

FOREIGN PATENT DOCUMENTS

DE    10 2005 010 289    9/2006
WO    WO 2005/012022    2/2005

*Primary Examiner* — Lindsay Low
*Assistant Examiner* — Robert Werner
(74) *Attorney, Agent, or Firm* — Kenyon & Kenyon LLP

(57) ABSTRACT

In a method for controlling a hybrid drive which is driven by an internal combustion engine designed as a first drive unit, and by a second drive unit, the internal combustion engine and the second drive unit contribute individually or jointly to the drive of the vehicle, and pollutant emissions are kept at the lowest possible level in all operating states of the hybrid drive. At least one control function for the internal combustion engine is carried out by a coordination unit which determines the point in time at which the internal combustion engine or the drive unit alone, or the internal combustion engine and the drive unit simultaneously, contribute to the drive of the vehicle.

11 Claims, 3 Drawing Sheets

(51) Int. Cl.
  *B60K 6/44* (2007.10)
  *B60K 6/48* (2007.10)
  *B60W 10/06* (2006.01)
  *B60W 10/08* (2006.01)
(52) U.S. Cl.
  CPC .......... *Y02T10/6221* (2013.01); *Y02T 10/6286* (2013.01); *Y02T 10/642* (2013.01)

(56) References Cited

U.S. PATENT DOCUMENTS

| | | | |
|---|---|---|---|
| 7,373,933 B2 * | 5/2008 | Kamada et al. | 123/568.21 |
| 2003/0160455 A1 | 8/2003 | Hu et al. | |
| 2006/0270519 A1 | 11/2006 | Kamada et al. | |
| 2008/0147294 A1 * | 6/2008 | Tomatsuri et al. | 701/102 |
| 2009/0030595 A1 * | 1/2009 | Sugai | 701/112 |

\* cited by examiner

METHOD AND SYSTEM FOR CONTROLLING A VEHICLE HAVING A HYBRID DRIVE

BACKGROUND OF THE INVENTION

1. Field of the Invention

The present invention relates to a method for controlling a vehicle having a hybrid drive which is driven by an internal combustion engine provided as a first drive unit, and by a second drive unit, the internal combustion engine and the second drive unit contributing individually or jointly to the drive of the vehicle, and a system for carrying out the method.

2. Description of Related Art

There is increasing development of vehicles having a hybrid drive, in which various drives are used for a drive function. The individual motors in the hybrid drive may cooperate in different ways.

Either the motors act simultaneously, or only one drive unit acts on the part to be moved.

The diesel engine may be used as the internal combustion engine in a hybrid drive train. When diesel engines are used, in hybrid drive trains the internal combustion engine is switched on or off during or after an electric motor operating phase in certain driving situations. When the internal combustion engine is switched on very quickly during or after an electric motor operating phase in order to deliver torque, the dynamics of the lean-operated internal combustion engine increase.

Such operating situations having higher combustion dynamics result in increased pollutant emissions, in particular nitrogen emissions.

BRIEF SUMMARY OF THE INVENTION

An object of the present invention, therefore, is to provide a method for controlling a vehicle having a hybrid drive, in which pollutant emissions are kept at the lowest possible level in all operating states of the hybrid drive.

The advantage of the present invention is that the pollutant emissions are minimized using functions which take only the hybrid-specific operation into account. The stated hybrid operating situations are situations in which the internal combustion engine and the second drive unit are in use simultaneously, or situations in which switching is performed from operation of the second drive unit to operation of the internal combustion engine, or vice versa, such as switching the internal combustion engine on or off during or after an operating phase in which the second drive unit delivers or receives torque.

The second drive unit may be an electric motor or a hydraulic drive. At least one control function for the internal combustion engine is advantageously carried out by a coordination unit, which determines the point in time at which the internal combustion engine or the drive unit alone, or the internal combustion engine and the drive unit simultaneously, contribute to the drive of the vehicle. Control functions which heretofore have been located in the engine control unit of the internal combustion engine are now accommodated in the coordination unit, which monitors and controls the internal combustion engine as well as the second drive unit. Problems arising in particular when the internal combustion engine is switched on and off may be coordinated, and, taking the requirements of the hybrid drive into account, optimized very quickly.

In one refinement, the coordination unit controls the interplay between the internal combustion engine and the electric motor, in that the coordination unit carries out a torque request and then determines the portion of the torque delivered by the internal combustion engine and the portion of the torque delivered by the drive unit.

At least during the hybrid operation of the vehicle, at least one emission-relevant control function of the internal combustion engine is carried out by the coordination unit, as a result of which the emissions characteristics are evaluated and regulated in conjunction with the instantaneous operating state of the hybrid drive.

Examples of emission-relevant functions are control of the injection system via the parameters injection pressure, injection duration, and time of injection, or control and regulation of the charge pressure for a diesel engine.

In addition to these named functions, for the hybrid-specific operation, an exhaust gas recirculation rate is also determined in the coordination unit as an emission-relevant function.

The exhaust gas recirculation rate may be optimally adjusted when the exhaust gas recirculation rate is determined as a function of the contributions of the internal combustion engine and of the drive unit to the vehicle torque.

In one refinement, during hybrid operation of the vehicle, the exhaust gas recirculation rate is ascertained as a function of a raw exhaust gas recirculation rate of the internal combustion engine designed as a diesel engine. The advantage is that the existing parameterization for a control unit of the diesel engine may be used for controlling the exhaust gas recirculation rate of a conventional vehicle (without hybrid drive) without changes in the control unit program packets, as well as for a hybrid vehicle. As a result, the development of specialized control units for the diesel engine in hybrid operation is dispensed with. Thus, control units which have been developed for the diesel engine without a hybrid drive may be used, since the correction of the exhaust gas recirculation rate for hybrid operation is carried out in the coordination unit.

In one embodiment of the present invention, the exhaust gas recirculation rate is ascertained as a function of the change in torque over time. Thus, the dynamics of the change in load are also detected by the coordination unit, which enables a rapid response to changes in the hybrid operation. It is thus possible to satisfactorily regulate the emission values also in operating situations having higher combustion dynamics, for example in cases in which the internal combustion engine is switched very quickly to the second drive unit.

In one particularly simple configuration, the internal combustion engine is controlled by a dedicated internal combustion engine control unit, while the second drive unit is operated by an independent drive motor control unit. However, since the coordination unit detects the emission-relevant functions of the internal combustion engine, it is of a higher-order level than these control units. The internal combustion engine control unit and the drive motor control unit are controlled by the coordination unit, in that the coordination unit sends control instructions, which it generates, to the internal combustion engine control unit and the drive motor control unit. Thus, the computing power of a single control unit is reduced by distributing it to the various control units.

However, other functions besides engine management may be carried out in the coordination unit. Thus, in addition to emission-relevant functions, the coordination unit also carries out at least one function of vehicle control. In one embodiment, the functions for controlling or regulating the exhaust gas recirculation rate are located in a vehicle control unit.

In a device for controlling a vehicle having a hybrid drive, which is driven by an internal combustion engine provided as a first drive unit and by a second drive unit, the internal combustion engine and the second drive unit individually or jointly contributing to the drive of the vehicle, in order to keep pollutant emissions as low as possible in all operating states of the hybrid drive, a coordination unit is included which carries out at least one control function for the internal combustion engine and which determines the point in time at which the internal combustion engine or the drive unit alone, or the internal combustion engine and the drive unit simultaneously, contribute to the drive of the vehicle. The coordination unit thus performs control functions which heretofore have been located in the engine control unit of the internal combustion engine.

The coordination unit makes a torque request in order to decide which portion of the torque is delivered by the internal combustion engine and which portion of the torque is delivered by the drive unit.

In order to adjust the emissions characteristics during hybrid drive of the vehicle, the coordination unit carries out an emission-relevant control function of the internal combustion engine, which advantageously is the determination of an exhaust gas recirculation rate.

In one refinement, the coordination unit is designed as a vehicle control unit which, in addition to the functions of vehicle control, also carries out functions of engine management of the internal combustion engine.

DETAILED DESCRIPTION OF THE INVENTION

Figure 1:
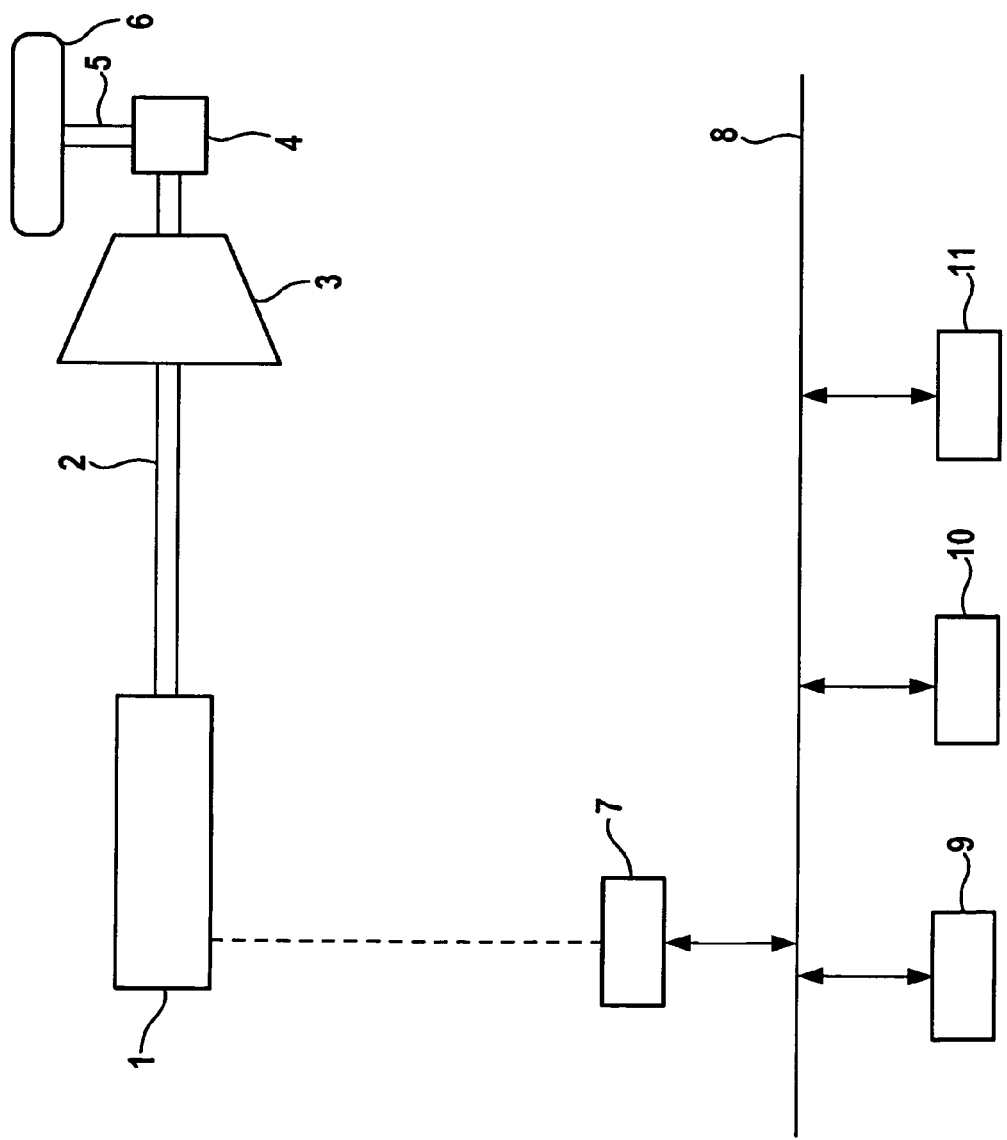
FIG. 1 shows a control unit structure for a conventional diesel drive according to the related art.

FIG. 1 illustrates a control unit structure for a conventional diesel drive train. Internal combustion engine 1, designed as a diesel engine, is connected to a transmission 3 via drive train 2. Transmission 3 in turn is connected via a differential 4 to wheel axle 5, which drives wheel 6.

Diesel engine 1 is controlled by an engine control unit (electronic diesel control) 7. Engine control unit 7 is the computer which provides overall control of diesel engine 1. In the present context, "overall control" is understood to mean the control or regulation of all components of diesel engine 1, which includes all actuators and control elements, for example injectors of the injection system or the EGR valve.

Engine control unit 7 communicates, via a CAN bus 8, with other components of the vehicle which likewise are provided with a control unit and which are necessary for the driving operation. These components include a compressor 9, a low-voltage battery 10, or the brake 11, whose control unit operates using an electronic stability program (ESP).

The components which are relevant for delivering the exhaust gases emitted by diesel engine 1, such as the injection system and the EGR valve, are controlled or regulated according to the related art solely by engine control unit 7.

Figure 2:
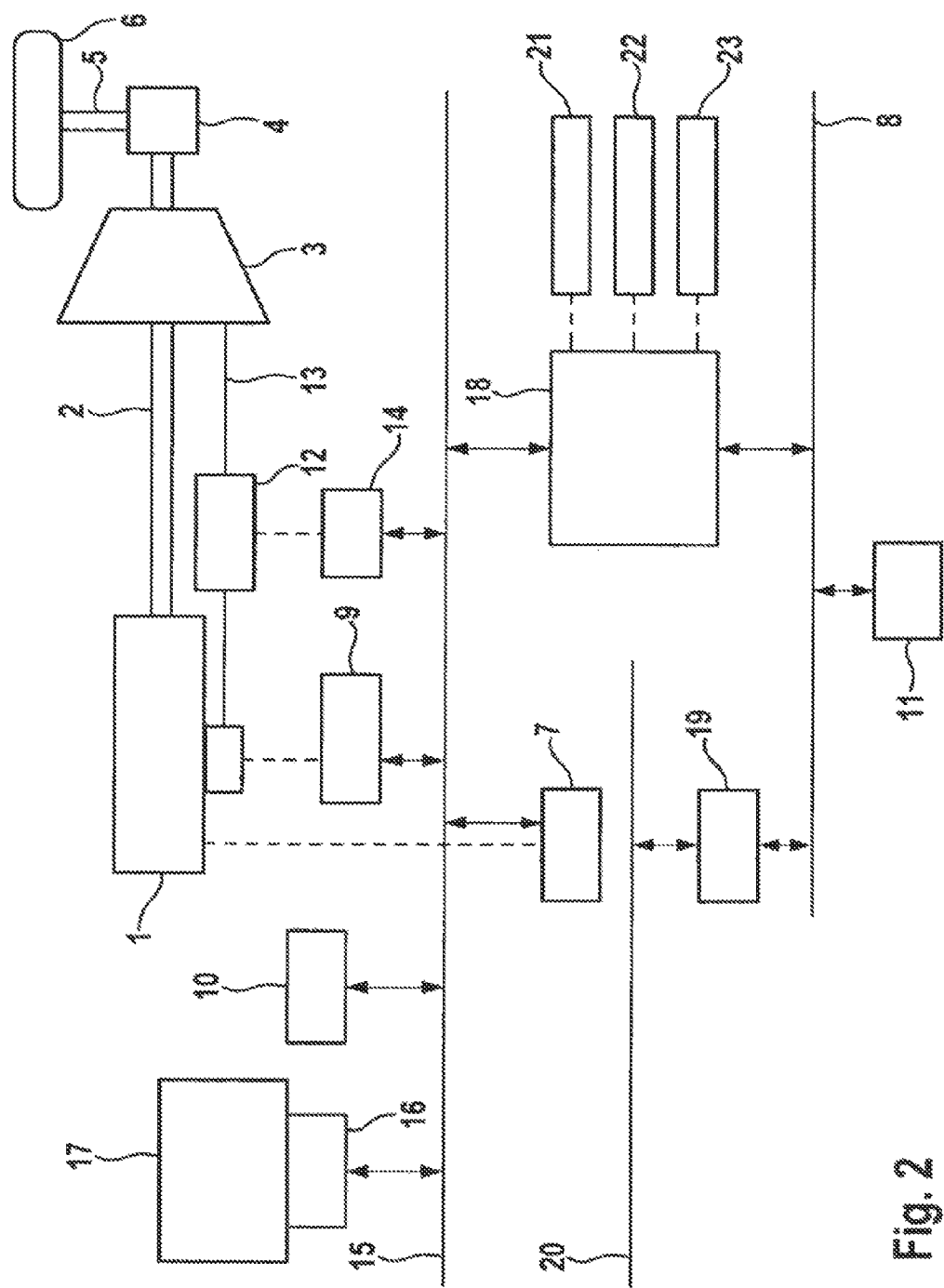
FIG. 2 shows one exemplary embodiment for an expanded control unit structure for vehicles having a hybrid drive.

FIG. 2 shows an expanded control unit structure for a vehicle having a hybrid drive. The hybrid drive is formed by a diesel engine 1 as the internal combustion engine and by an electric motor 12 as the second drive unit. As previously described, diesel engine 1 is connected, via drive train 2, to transmission 3, which in turn leads to wheel axle 5 for driving wheel 6 via differential 4.

Electric motor 12 is connected via its own drive train 13 to transmission 3, and thus contributes to the drive of wheels 6 and to the total torque of the vehicle. Electric motor 12 also has its own electric motor control unit 14, which is connected to a hybrid CAN bus 15 via which all of the control units which have an influence on the hybrid-specific driving operation of the vehicle communicate with one another. These include battery management system 16 of traction battery 17, low-voltage battery 10, alternating current (AC) compressor 9, and other control units, not shown in greater detail, which control the transmission, among other things. Engine control unit 7 of diesel engine 1 is likewise connected to hybrid CAN bus 15.

A vehicle control unit 18 also communicates via hybrid CAN bus 15 with the control units connected thereto, in particular with engine control unit 7 and electric motor control unit 14. The vehicle control unit is also connected to the control unit for brake 11 via CAN bus 8. CAN bus 8 is connected, via a gateway 19, to a gateway CAN bus 20, via which the individual bus systems of the vehicle communicate with one another.

Vehicle control unit 18 is connected to various sensors of the vehicle, such as an operating parameter sensor 21, temperature sensor 22 which indicates the cooling water temperature, and voltmeter 23, which is connected to the DC/DC converter. Vehicle control unit 18 receives information from these sensors 21, 22, 23 concerning the instantaneous operating parameters for the vehicle operation.

The torque of the output side for the hybrid vehicle is controlled in vehicle control unit 18. For this purpose, vehicle control unit 18 evaluates the setpoint data which are set by the driver of the hybrid vehicle via the gas pedal and delivered by operating parameter sensor 21. The torque which is relevant for the output side is applied by diesel engine 1 and by electric motor 12. Vehicle control unit 18 functions as a coordination unit, and coordinates the contributions to the torque provided by diesel engine 1 and electric motor 12. Thus, vehicle control unit 18 is of a higher-order level than engine control unit 7 and electric motor control unit 14.

The relevant functions for the hybrid operation for influencing the exhaust gas emissions are located in vehicle control unit 18. The hybrid-specific data set concerning emissions is stored in the hybrid-specific functions of vehicle control unit 18. The data set for engine control unit 7 may thus remain unchanged compared to a conventional application in a diesel vehicle. In evaluating the emission-specific functions, vehicle control unit 18 sends control signals to engine control unit 7 and electric motor control unit 14, which control the actuators via the particular received control signal. Thus, engine control Unit 7 actuates the EGR valve as specified by vehicle control unit 18.

Engine control unit 7 and vehicle control unit 18 are shown in separate modules in FIG. 2. However, the functionalities of the engine control and of the vehicle control may also be combined in hardware without affecting the described characteristics.

Figure 3:
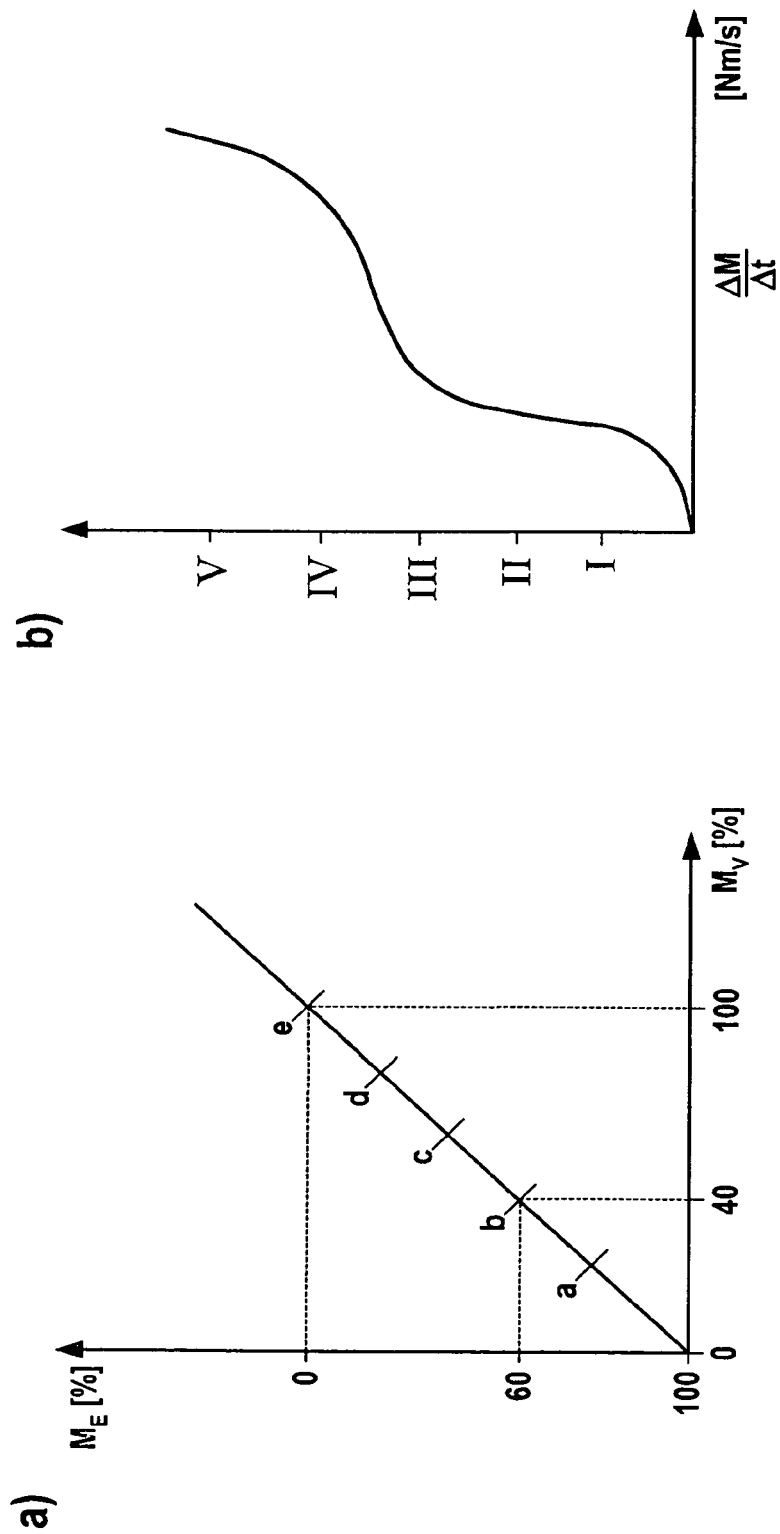
FIG. 3 illustrates the function for controlling an EGR valve in a vehicle control unit.

The diagrams shown in FIG. 3 illustrate the manner in which the exhaust gas recirculation rate EGR for the hybrid operating case is determined in vehicle control unit 18.

The table shown under a), which plots portion $M_E$ of electric motor 12 and portion $M_V$ of internal combustion engine 1 which are applied to the total torque of the vehicle, is stored in vehicle control unit 18. Portions $M_E$ and $M_V$ are expressed as percentages (%).

There is a linear relationship between torque portion $M_E$ of electric motor 12 and torque portion $M_V$ of internal combustion engine 1, since their sum must always equal 100%.

A factor for changing the EGR valve position is determined as a function of the torque delivered by internal combustion engine 1 and by electric motor 12. If torque portion $M_E$ of electric motor 12 is 0% and torque portion $M_V$ of internal combustion engine 1 is 100%, factor e results from the diagram in FIG. 3a.

If the hybrid operation is in the state for which electric motor 12 has a torque portion $M_E$=60% and internal combustion engine 1 contributes 40% to the torque, factor b is taken into account in the further computations.

New value $EGR_{new}$ for actuating the EGR valve in certain hybrid-relevant operating situations is obtained by multiplying the factor, determined from FIG. 3a for correcting the EGR valve value, by value $EGR_{EDC}$, which is contained in engine control unit 7 for conventional operation of a diesel vehicle, and which also may be referred to as the raw exhaust gas recirculation rate.

$$EGR_{new}=b \times EGR_{EDC}$$

In one optimal embodiment, the factors stored in vehicle control unit 18 may be superimposed by additional factors. FIG. 3b) illustrates the dynamics of torque jump $\Delta M$ as a function of time $\Delta t$, which in some hybrid operating situations is likewise relevant to emissions. This characteristics map is also stored in the vehicle control unit and is continuously updated.

Depending on the particular section in which the change in torque over time $\Delta M/\Delta t$ is currently located, here a correction factor, iv for example, is also associated which is entered into the above equation as an additional multiplier. The equation then has the following form:

$$EGR_{new}=b \times iv \times EGR_{EDC}$$

Using this method ensures minimal pollutant emissions in all operating states of the hybrid operation, since the method may be used not only for adjusting the exhaust gas recirculation rate, but in principle may also be used for all other emission-relevant functions.

What is claimed is:

1. A method for controlling a vehicle having a hybrid drive including a first drive unit and a second drive unit, the first drive unit being an internal combustion engine, the method comprising:
   selectively controlling the internal combustion engine and the second drive unit with the aid of a coordination unit, wherein the coordination unit determines respective points in time when the internal combustion engine and the second drive unit contribute to overall driving of the hybrid drive, each of the internal combustion engine and the second drive unit being configured to be selectively driven based on the coordination unit determination: (a) alone, whereby only one of the internal combustion engine or the second drive unit contributes to the overall driving of the hybrid drive; or (b) jointly, whereby both the internal combustion engine and the second drive unit contribute to the overall driving of the hybrid drive; and
   performing at least one control function for the internal combustion engine by the coordination unit;
   wherein an exhaust gas recirculation valve position is set by the coordination unit as a function of respective contributions to the vehicle torque from the internal combustion engine and the second drive unit and of a change in torque over time.

2. The method as recited in claim 1, wherein a torque request is carried out by the coordination unit, and wherein the coordination unit determines respective portions of the requested torque delivered by the internal combustion engine and the second drive unit.

3. The method as recited in claim 1, wherein the internal combustion engine is a diesel engine, and wherein the exhaust gas recirculation valve position during the hybrid operation of the vehicle is ascertained as a function of a raw exhaust gas recirculation rate of the diesel engine.

4. The method as recited in claim 1, wherein the exhaust gas recirculation valve position is ascertained as a function of the change in torque over time.

5. The method as recited in claim 1, wherein the coordination unit controls an internal combustion engine control unit and a drive motor control unit.

6. The method as recited in claim 1, wherein at least one function of the vehicle control is carried out by the coordination unit.

7. A control device for controlling a vehicle having a hybrid drive including a first drive unit and a second drive unit, the first drive unit being an internal combustion engine, the control device comprising:
   a coordination unit configured to (a) perform at least one control function from the internal combustion engine and (b) determine respective points in time when the internal combustion and the second drive unit contribute to overall driving of the hybrid drive, each of the internal combustion engine and the second drive unit being configured to be selectively driven based on the coordination unit determination: (i) alone, whereby only one of the internal combustion engine or the second drive unit contributes to the overall driving of the hybrid drive; or (ii) jointly, whereby both the internal combustion engine and the second drive unit contribute to the overall driving of the hybrid drive;
   wherein an exhaust gas recirculation valve position is set by the coordination unit as a function of respective contributions to the vehicle torque from the internal combustion engine and the second drive unit and of a change in torque over time.

8. The device as recited in claim 7, wherein the coordination unit is configured to: (a) carry out a torque request; and (b) determine respective portions of the requested torque delivered by the internal combustion engine and the second drive unit.

9. The device as recited in claim 8, wherein the coordination unit is configured to control an internal combustion engine control unit and a drive motor control unit.

10. The method as recited in claim 1, wherein the exhaust gas recirculation valve position is determined according to the equation:

$$EGR_{new}=b*iv*EGR_{EDC},$$

wherein,
$EGR_{new}$ is the new valve position;
b is a correction factor determined by respective contributions to the vehicle torque from the internal combustion engine and the second drive unit;
iv is a correction factor determined according to a change in torque over time;
and $EGR_{EDC}$ is a raw exhaust gas recirculation rate of the diesel engine.

11. The control device of claim 7, wherein the exhaust gas recirculation rate valve position is determined according to the equation:

$$EGR_{new}=b*iv*EGR_{EDC},$$

wherein, $EGR_{new}$ is the new valve position;

b is a correction factor determined by respective contributions to the vehicle torque from the internal combustion engine and the second drive unit;

iv is a correction factor determined according to a change in torque over time;

and $EGR_{EDC}$ is a raw exhaust gas recirculation rate of the diesel engine.

* * * * *